United States Patent [19]

Gehman

[11] Patent Number: 4,595,924

[45] Date of Patent: Jun. 17, 1986

[54] INTRUDER DETECTION RADAR SYSTEM AND AUTOMATIC NULLING ANTENNA ARRAY

[75] Inventor: John B. Gehman, La Jolla, Calif.

[73] Assignee: General Dynamics Electronics, San Diego, Calif.

[21] Appl. No.: 629,067

[22] Filed: Jul. 9, 1984

Related U.S. Application Data

[63] Continuation of Ser. No. 308,992, Oct. 6, 1981, abandoned.

[51] Int. Cl.[4] .................. G01S 13/04; G08B 13/18
[52] U.S. Cl. ..................... 343/5 PD; 340/554; 343/9 R
[58] Field of Search ............ 343/5 PD, 7 A, 7.7, 343/8, 9 R, 10, 15, 463, 465; 340/552, 554, 567, 565

[56] References Cited

U.S. PATENT DOCUMENTS

| | | | |
|---|---|---|---|
| 2,515,332 | 7/1950 | Budenbom | 343/15 |
| 3,550,106 | 12/1970 | Gehman | 340/258 |
| 3,706,982 | 12/1972 | Gehman | 340/258 C |
| 3,731,305 | 5/1973 | Gehman | 343/5 PD |
| 3,761,908 | 9/1973 | Gehman | 340/258 R |
| 3,794,992 | 2/1974 | Gehman | 343/5 PD |
| 3,836,960 | 9/1974 | Gehman et al. | 343/5 PD |
| 3,995,271 | 11/1976 | Goggins, Jr. | 343/7 A |
| 4,051,472 | 9/1977 | Albanese et al. | 343/5 PD |
| 4,135,185 | 1/1979 | Rotman et al. | 340/552 |
| 4,213,122 | 7/1980 | Rotman et al. | 340/552 |

OTHER PUBLICATIONS

J. D. Kraus, "Antennas" 1950, McGraw-Hill Book Co., pp. 292–295.
Aviation Week & Space Technology, Jun. 29, 1981, "System Updates Enhance Base Security" by Kenneth J. Stein, pp. 63–65.

Primary Examiner—T. H. Tubbesing
Assistant Examiner—Gilberto Barrón, Jr.
Attorney, Agent, or Firm—Brown, Martin & Haller

[57] ABSTRACT

A bistatic VHF Doppler radar is utilized to detect and track one or more intruders crossing a large annular ring surveilance zone surrounding a central high security installation. A central omni-directional transmitter radiates the surveillance zone with a continuous wave (CW) signal. Predetermined ones of a plurality of receiver antennas circumferentially spaced around the surveillance zone receive a portion of the signal which is reflected by an intruder crossing the surveillance zone and a portion of the signal which is directly radiated from the transmitter antenna. The reflected signal portion may be received by antenna arrays each of which is controlled to form a null in its pattern toward the transmitter antenna to overcome direct signal overload. The direct signal portion may be received by stub antennas. Each antenna array and each stub antenna is connected to a separate channel of a dual channel receiver. An intruder moving across the surveillance zone causes signals representative of Doppler cycles of phase change to be generated. The outputs of the two separate channels are compared and their relative phase changes measured. A detected intruder causes an alarm signal at a central processing station and the Doppler information is processed to generate tracking data which is shown on a display device. An automatic null control circuit may also be utilized to accommodate multipath conditions and static clutter due to environmental factors.

9 Claims, 15 Drawing Figures

FIG. 4

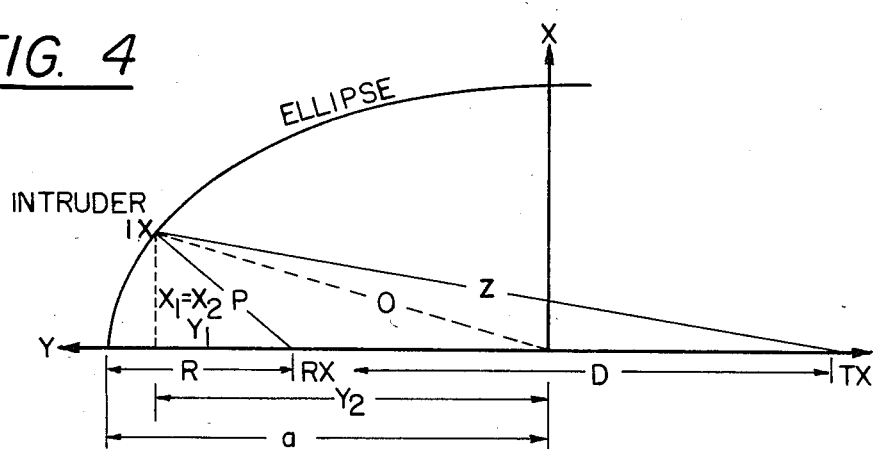

- SIGNAL PATHS $T_X$ TO $I_X$ = Z : $I_X$ TO $R_X$ = P (REFLECTED PATH)
  $T_X$ TO $R_X$ = D (DIRECT PATH)
- SYSTEM MEASURES DIFFERENCE IN DIRECT AND REFLECTED PATHS
- THE LOCUS OF ALL POINTS SATISFYING (Z+P)−D = A CONSTANT (2R) IS AN ELLIPSE BY MATHEMATICAL DEFINITION
- THE MAJOR AXIS IS ALONG (a) AND THE MINOR AXIS ALONG b
  $a = R + D/2$   $b = \sqrt{R^2 + (R \times D)}$
- $X_1 = P \sin\phi$ : $Y_1 = P \cos$
- $X_2 = A \sin\theta$ : $Y_2 = B \cos\theta$   $\dfrac{X_2^2}{b^2} + \dfrac{Y_2^2}{a^2} = 1$
- IN TERMS OF WAVELENGTH $\lambda$ : $2R = N\lambda$ OR $R = N\lambda/2$
- $Z + P = 2R + D$

LOCATIONS

WHERE  $T_X$ TRANSMITTER LOCATION
       $R_X$ RECEIVER LOCATION
       $I_X$ INTRUDER LOCATION

DISTANCES

D DISTANCE BETWEEN $T_X$ & $R_X$
P DISTANCE TO $I_X$ FROM $R_X$
Q DISTANCE TO $I_X$ FROM POINT D/2
Z DISTANCE TO $I_X$ FROM $T_X$
N NUMBER OF WAVELENGTHS ~ DOPPLER CYCLES

INTRUDER DIRECTION $\phi$ ANGLE FROM MAJOR AXIS AT $R_X$
$\theta$ ANGLE FROM MAJOR AXIS AT D/2

INTRUDER DETECTION RADAR SYSTEM AND AUTOMATIC NULLING ANTENNA ARRAY

This is a continuation of application Ser. No. 308,992, filed Oct. 6, 1981, now abandoned.

BACKGROUND OF THE INVENTION

The present invention relates to security systems, and more particularly, to an intruder detection system which utilizes a bistatic Doppler radar tracking scheme.

Many building complexes require heavy security, for example, nuclear processing, manufacturing and stockpiling sites. In connection with this type of installation, it is desirable to provide a detection zone which surrounds the installation and is spaced a predetermined safe distance therefrom to permit early detection of an intruder so that a timely response can be initiated. As a security installation becomes larger, the detection zone increases in size. It is then necessary to provide a capability for both detecting an intruder and tracking the intruder to facilitate interception. Such tracking also provides an indication of the intruder's intent since it often indicates an effort to enter a key building.

In order to provide adequate security, the detection zone must be substantial in size. For example, the detection zone may comprise an annular ring having an inner edge which is radilly spaced approximately eight kilometers from the center of the location which is to be protected. Furthermore, the annular ring may have a radial width of approximately one kilometer. The foregoing criteria result in a detection zone enclosing approximately one-hundred million square meters and having an outside perimeter of approximately fifty-two kilometers. Such a high security installation needs to be located in an open and unpopulated area in order to reduce the likelihood of intrusions by local residents and possibly large domestic animals.

A security system for a military, nuclear, or similarly sensitive installation should be capable of the following functions: detection of an intruder; discrimination between real threats, false alarms and nuisance alarms; generating an alarm signal and accompanying display in response to a real threat; certain control features; and deterrent capabilities. False alarms refer to those which are self-generated by internal noise of the equipment, while nuisance alarms refer to those which are generated by actual detections of external phenomena. For example, nuisance alarms can be caused by non surreptitious entry by local residents, stray cattle, various other flora and fauna, and extreme wind conditions such as high wind and lightning. As to human instrusions, there is no foolproof way to determine whether the detected individual has an aggressive intent. Therefore, it is prudent to physically intercept all detected human intruders.

Such a security system should be capable of detecting, in addition to human intruders, vehicles weighing between approximately two hundred and two thousand kilograms. Furthermore, it is desirable for such a security system to be capable of simultaneously detecting and tracking multiple intrusions.

Conventional pulse type scanning radar is inappropriate for use in security systems designed to detect intruders in a large annular surveillance zone. This is because the intruder could move toward the protected area once the beam from the rotating antenna has swept past. Utilizing an electronic sensing device, the intruder would then be able to escape detection as the beam swept past his location by, for example, hiding in a low spot in the ground.

Seismic and acoustic devices have been utilized in security systems in the past. However, often such devices require a significant amount of motion of the intruder in order to be detected. Conventional Doppler radar, such as that utilized by police, is incapable of discriminating effectively between various moving objects. Therefore, it would be insuitable for monitoring a large annular surveillance zone. Leaky transmission lines have also been utilized as intruder detection devices. They may be embedded in the soil. Interferences with reception and/or transmission which result from the lines being stepped on can be detected to determine the presence of an intruder. A further discussion of developments in security systems may be found in an article entitled "System Updates Enhance Base Security", by Kenneth J. Stein, published on page 63 of the June 29, 1981 issue of "Aviation Week & Space Technology" magazine.

In my U.S. Pat. No. 3,550,106, there is described an electromagnetic object detection system in which a sensing field is established in an area to be secured by an unobtrusive antenna. The antenna is excited by dual oscillators so as to establish a field having two frequencies. Shifts in the frequency differential of the generated signals are utilized to provide output signals which are processed to detect the intruding object.

In my U.S. Pat. Nos. 3,706,982; 3,731,305; and 3,761,908, there are disclosed similar dual frequency intrusion detection systems which are capable of discriminating against noise or other spurious effects. In my U.S. Pat. No. 3,836,960, there is described an intrusion detection system which transmits continuous wave signals in the VHF or UHF frequency bands and receives modulation components of the signals which are reradiated from metal bodies that are in contact with each other. None of the prior intrusion detection systems is suitable for continuously monitoring a large annular surveillance zone and for providing tracking information in regard to a detected intruder.

SUMMARY OF THE INVENTION

It is therefore the primary object of the present invention to provide a system capable of detecting intruders into a large annular ring surveillance zone surrounding a high security installation.

It is another object of the present invention to provide an intrusion detection system of the aforementioned type which has a low degree of false alarms yet which is highly sensitive to an actual intruder.

It is another object of the present invention to provide an intruder detection system of the aforementioned type which is capable of accommodating multipath conditions and static clutter due to environmental factors.

Still another object of the present invention is to provide an intruder detection system of the aforementioned type which will not only detect an intruder but will also track the intruder so that he or she can be timely intercepted.

Another object of the present invention is to provide an intruder detection system of the aforementioned type which utilizes a receiver antenna array whose pattern can be adjusted to produce a null toward a central transmitter antenna.

Another object of the present invention is to provide an intruder detection system of the aforementioned type which is capable of accurately detecting and tracking multiple intruders simultaneously.

A further object of the present invention is to provide a receiver array and a circuit for automatically adjusting a null in the pattern of the array according to predetermined requirements.

Accordingly, the present invention provides a system in which a bistatic VHF Doppler radar is utilized to detect and track one or more intruders crossing a large annular ring surveilance zone surrounding a central high security installation. A central omni-directional transmitter radiates the surveillance zone with a continuous wave (CW) signal. Predetermined ones of a plurality of receiver antennas circumferentially spaced around the surveillance zone receive a portion of the signal which is reflected by an intruder crossing the surveillance zone and a portion of the signal which is directly radiated from the transmitter antenna. The reflected signal portion may be received by antenna arrays each of which is controlled to form a null in its pattern toward the transmitter antenna to overcome direct signal overload. The direct signal portion may be received by stub antennas. Each antenna array and each stub antenna is connected to a separate channel of a dual channel receiver. An intruder moving across the surveillance zone causes signals representative of Doppler cycles of phase change to be generated. The outputs of the two separate channels are compared and their relative phase changes measured. A detected intruder causes an alarm signal at a central processing station and the Doppler information is processed to generate tracking data which is shown on a display device. An automatic null control circuit may also be utilized to accommodate multipath conditions and static clutter due to environmental factors.

BRIEF DESCRIPTION OF THE DRAWINGS

In FIG. 1A, a portion of the surveillance zone is shown in perspective and the circles enclose enlargements of various components. In FIG. 1B, the system is shown in a reduced plan view.

FIGS. 4 and 5 illustate the Doppler geometry of the system.

DESCRIPTION OF THE PREFERRED EMBODIMENTS

Figure 1A:
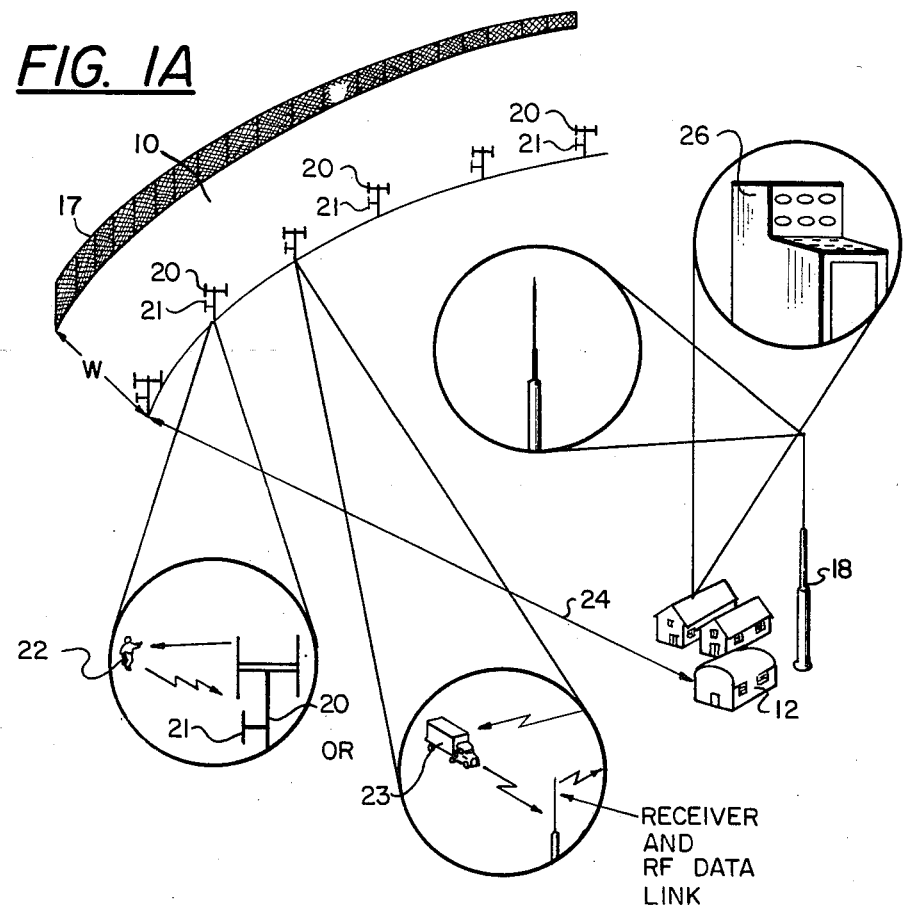
FIGS. 1A and 1B are simplified views of the layout of a preferred embodiment of my intruder detection system illustrating the manner in which its central omni directional transmitter antenna illuminates an annular ring surveillance zone about which are circumferentially spaced a plurality of receiver antennas.
Figure 1B:
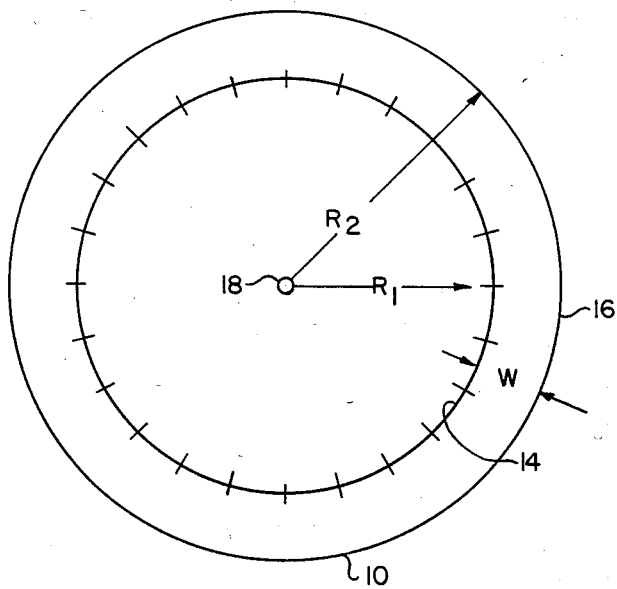

Referring to FIGS. 1A and 1B, there is illustrated therein in simplified form an annular ring surveillance zone 10 which surrounds a complex 12 of high security buildings located at its center. The annular surveillance zone has a substantial size, for example, its inner circular perimeter 14 may have a radius $R_1$ of approximately eight kilometers and its outer circular perimeter 16 may have a radius $R_2$ of approximately nine kilometers. Thus, the surveillance zone 10 may have a radial width W of approximately one kilometer. With these dimensions, the zone 10 encloses an area of approximately $5.3 \times 10$ square meters. The outer perimeter 16 of the surveillance zone measures approximately fifty-six and one-half kilometers. Therefore, the security complex 12 should be located in an open and unpopulated area in order to reduce nuisance alarms from miscellaneous intrusions by local residents and large domestic animals. The zone is preferably surrounded by a fence 17.

An omni-directional VHF transmitter antenna 18 located in the center of the annular surveillance zone 10 illuminates the fixed and moving targets within this zone. A plurality of receiver antennas 20 and 21 are circumferentially spaced around the surveillance zone for receiving a portion of the signal which is reflected by these targets, as well as a portion of the signal which is directly radiated from the transmitter antenna 18. The antennas 20 are arrays which are controlled to maximize reflected signal reception while minimizing direct signal reception. The antennas 21 receive the direct signal and need not be efficient. The antennas 21 may be simple stub antennas. Each antenna array 20 is paired with a stub antenna 21 at a site, there being a plurality of annularly spaced receiving sites. Only the moving targets, such as a human intruder 22 or a vehicle 23, produce a Doppler effect in the receiver antenna arrays 20.

Means (not shown in FIGS. 1A and 1B) are coupled to the receiver antennas 20 and 21 for comparing the reflected and directly radiated signal portions and producing output signals representative of the Doppler effect of the intruder on the signal. These output signals are transmitted via a data link such as wires 24, to a computer 26 housed in one of the buildings of the central security complex 12. The computer receives the output signals representative of the Doppler information from adjacent receiver antennas, and computes tracking data utilizing the known spacing between the receiver antennas. This tracking data represents the location, velocity and direction of motion of the intruder 22 and is displayed on a properly formatted screen (not shown). The tracking data may also be permanently generated on a hard copy printer (not shown).

As with any security system, it is important to utilize other detectors, sensors, and systems to assure initial detection and to reduce the likelihood that an intruder will go undetected throughout the encounter. For example, in FIGS. 1A and 1B, other sensors which do not form part of the intruder detection system of the present invention could be utilized. These could include those types mentioned in the background discussion above. Supporting sensors physically located adjacent the outer perimeter 16 of the surveillance zone 10 may provide the initial detection, after which the system of the present invention tracks the intruder within the surveillance zone. However, it should be emphasized that the system of the present invention is capable of producing an alarm in response to an initial intrusion into the surveillance zone.

Prior experience in VHF intrusion devices has indicated that frequencies from approximately fifty to approximately one-hundred and fifty MHz provide a maximum available radar cross section while minimizing the response from smaller objects. In addition, these frequencies provide a good foilage penetration and immunity to environmental effects. A man standing on the ground resonates at a frequency of sixty MHz. At that frequency, the typical height of a man is slightly larger than approximately one-quarter of a wave length. However, due to the proximity of the man to the ground, his effective length is approximately one-quarter wave length.

The system described herein is capable of tracking humans of one to two meters in height and weighing approximately thirty to one-hundred kilograms. It can also track vehicles weighing approximately two-hundred to two thousand kilograms. The spread of velocities that the system is capable of tracking is in the range of approximately one-tenth to fifty meters per second. The coverage from the central security complex is approximately 360 degrees in azimuth and vertically to one-hundred meters above the surveillance zone. Preferably, the system has sufficient capacity to detect and track at least thirty simultaneous intrusions and is designed to have a false alarm rate (FAR) of less than ten per day.

Preferably, the principal operating frequency of the central omni-directional transmitter antenna 18 is sixty MHz. For a prototype of the system described above, it has been determined that an intruder entering the surveillance zone will provide an intrusion signal which is approximately sixteen and one-half db over the receiver noise limited to a bandwidth of approximately two and one-half Hz and using a twenty watt, continuous wave (CW), sixty MHz transmitter coupled to a vertical omni directional radiating transmitter antenna having a height of approximately eighty feet. Other intrusions such as vehicles and helicopters provide a greater radar cross section and a greater reflected signal.

Two receiver antenna arrays can provide accurate tracking data to within a few meters if an accurate starting location is specified. However, errors in the starting location in a single frequeuncy system are maintained during the track as a type of integration constant error. Therefore, as hereafter described, a modification of the basic intruder detection system of the present invention transmits and receives two CW signals at, for example, sixty and fifty-nine and nine-tenths MHz. The relative phase of the Doppler signals at each receiver antenna array are compared to provide a type of range measurement. The accuracy of this range measurement is within twenty meters, and repeated average measurements during tracking may reduce the possible error to approximately two meters.

Figure 2:
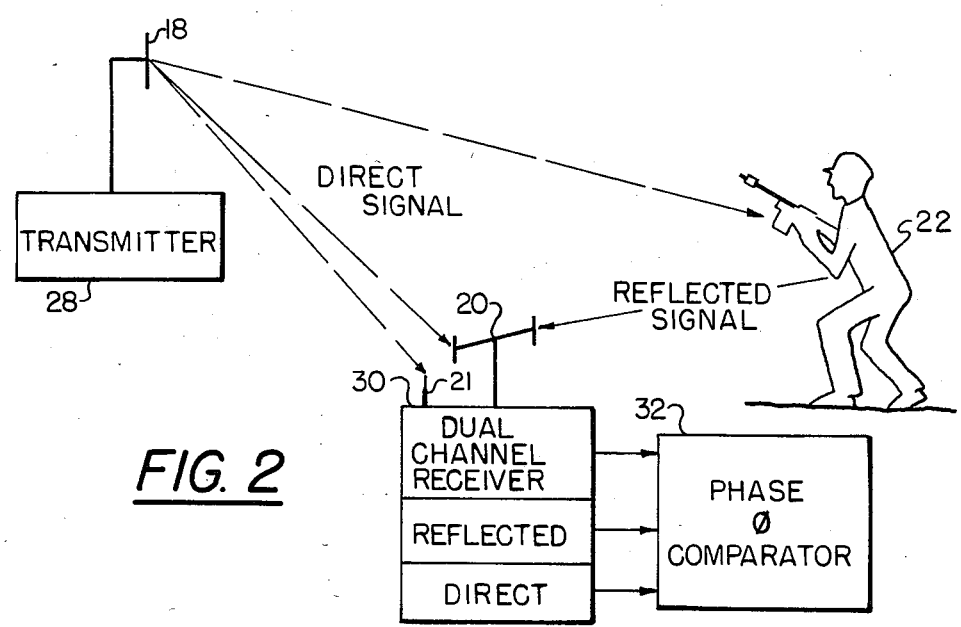
FIG. 2 is a functional block diagram illustrating the manner in which an intruder crossing the surveillance zone reflects part of the signal radiated from the central omni directional transmitter back to one of the receiver antenna arrays and the manner in which a portion of the directly radiated signal is received by a stub antenna.

FIG. 2 illustrates a simple block diagram of the intruder detection system of the present invention. A transmitter 28 is coupled to the transmitter antenna 18 for causing an electromagnetic CW signal to radiate the annular ring surveillance zone 20 (FIG. 1B) which surrounds the transmitter antenna. Thus, the transmitter provides an RF field which is intercepted by the human intruder 22 (FIG. 2) when the intruder enters the surveillance zone by crossing its outside perimeter. The intruder reflects part of the signal back to at least one of the receiver antenna arrays 20. The transmitter antenna 18 also provides a direct signal to the adjacent stub antenna 21.

Figure 3:
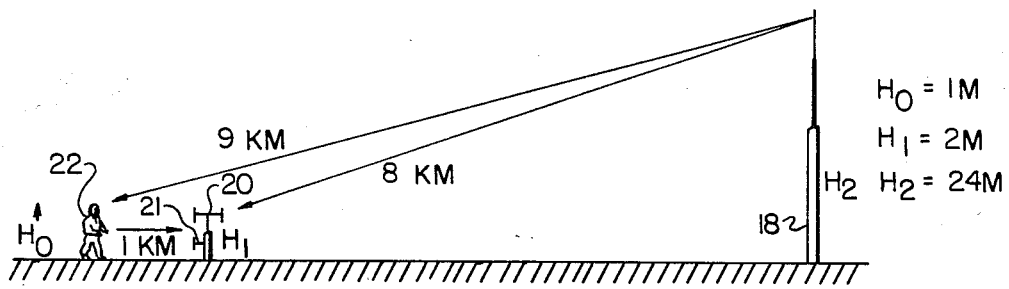
FIG. 3 is a simplified elevation view illustrating the height relationships between the various antennas.

The receiver antenna array 20 (FIG. 2) is connected to the reflected signal channel of a dual channel receiver 30. The adjacent stub antenna 21 is connected to the direct signal channel of the receiver 30. The outputs of the two separate channels of the receiver are fed to a phase comparator 32 which compares the outputs and measures their relative phase change. Signals from the phase comparator 32 (FIG. 2) are transmitted via a data link to the central computer 26 (FIG. 1) for processing. The data link may consist of hard wires, optical transmission lines, or RF communications equipment. For a transmitted frequency of approximately sixty MHz, when the intruder moves approximately eight to sixteen feet toward a receiving antenna, 360 degrees of phase change produces one Doppler cycle. FIG. 3 illustrates the vertical height relationship between the transmitter antenna 18, one of the receiver antenna arrays 20 and the intruder 22, for the preferred embodiment of the intruder detection system described herein.

The main purpose of the receiving antenna arrays 20 is to pick up the reflected signal portions from one or more intruders. The sensitivity of each receiver 30 and the gain of each receiver antenna array 20 determines the effective intruder tracking range of each receiving site. The tracking range then determines the number of sites required to cover the annular surveillance zone.

For the system with the parameters specified above, the direct signal may be approximately one-hundred and three db greater than the reflected signal. Noise on the direct carrier would therefore exceed and mask any other received signals and prevent adequate signal processing to determine Doppler sense. Therefore, each of the receiver antenna arrays 20 is constructed and controlled as hereafter described to reduce the amount of direct signal received by forming a null in its pattern toward the transmitter and by providing general coverage elsewhere. There is no need to detect intrusions behind the receiving antenna arrays since friendly personnel will be within the inner perimeter of the annular surveillance zone. In addition, the Doppler signals are virtually reduced to zero for intrusions between the receiving antenna arrays and the transmitting antenna. The specific coverage of the ring shaped surveillance zone by the plurality of receiver antenna arrays will be discussed hereafter.

The radiated signal strengths at various locations may be computed for twenty watts of radiated power from a high gain vertical transmitter antenna assumed to be six db over an isotropic source. Each of the receiver antenna arrays may have a six db gain (isotropic reference) and a minus sixty db null (backward gain). The null permits a more favorable direct-to-reflected signal ratio, i.e., minus forty-two and one-half db. These signal budget relationships are set forth in Table I hereafter:

TABLE I

| | | Direct Signal | Reflected Signal |
|---|---|---|---|
| 1. Transmitter power | 20 W | +43 dBm | +43 dBm |
| 2. Transmitter antenna gain (over isotropic) | +6 dB | +49 dBm | +49 dBm |
| 3. Range loss @ 60 MHz free space | 8 km −86.02 dB | −37 dBm | — |
| | 9 km −87.04 dB | — | −38 dBm |
| 4. Ground reflection loss | 8 km site −12 dB | −49 dBm | — |
| | 9 km site −12 dB | — | −50 dBm |
| 5. Intruder (man) reflection loss | −5.5 dB | — | −55 dBm |
| 6. Range loss @ 60 MHz intruder-to-receiver | 1 km −70 dB | — | −125.5 dBm |
| 7. Ground reflection loss intruder-to-receiver site | −32 dB | — | −157.5 dBm |
| 8. Receiving antenna forward gain (isotropic) (2-element array) | 6 dB | — | −151.5 dBm |
| backward gain | −60 dB | −109 dBm | — |
| 9. Receiving antenna reference channel (direct signal) | 2 dB | −51 dBm | — |
| 10 Direct signal leak-through into reflected-signal channel. | | | −42.5 db |

The geometry of the Doppler detection scheme utilized by the system of the present invention may be better understood by way of reference to FIG. 4. The distances indicated therein are in the horizontal plane. A direct signal from the transmitter travels from $T_x$ to one of the stub antennas 21 at $R_x$ over a distance D. An indirect signal travels from the transmitter $T_x$ to the intruder $I_x$ and is reflected back to one of the receiver antenna arrays 20 located at $R_x$ over a combined path length of Z+P. The difference in path length is two times R. If two times R is made to be a constant and Z and P are variable, an ellipse will be generated about two foci, namely $T_x$ and $R_x$. When theta (Θ) equals zero degrees, P equals R and Z equals D plus R. Variations in the constant R will generate different ellipses. If R is measured in terms of the wave length of the transmitted signal, then two times R equals N times lamda (λ) or R equals N times lamda divided by two, where lamda equals the wave length of the CW radiated signal.

Each ellipse in FIG. 4 can be represented by a specific whole number N. In addition, each ellipse also represents a locus of points of constant phase delay of the reflected path when compared to the direct path in increments of 360 degrees (two times π radians). An intruder passing through N ellipses will generate N Doppler cycles of 360 degrees of phase change at a phase comparator located at $R_x$. As defined herein, there are Doppler cycles. Each Doppler cycle, represented by a corresponding ellipse (isophase curve) has a specific geographic location with respect to its foci, $T_x$ and $R_x$. Thus, identifying N, will identify an intruder crossing a specific ellipse.

Figure 5:
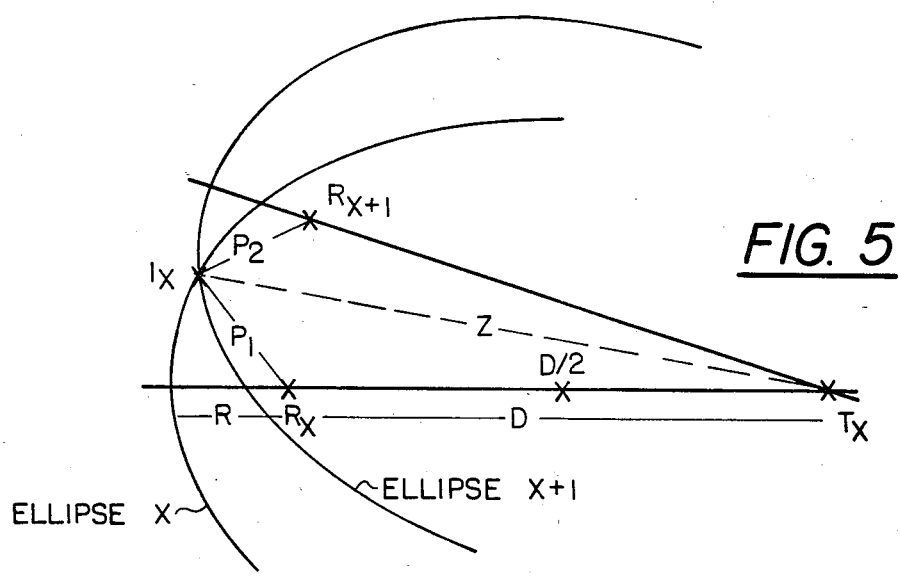

As shown in FIG. 5, a second receiver antenna array 20 located at Rx+1 adjacent to the receiver antenna array 20 located at $R_x$ of FIG. 4 will also receive a reflected signal portion from the same intruder $I_x$. As shown in FIG. 5, the indirect signal received by the receiver antenna array at Rx+1 travels from the transmitter $T_x$ to the intruder $I_x$ and is reflected back to the receiver array at Rx+1 over a combined path length of Z plus $P_2$. For the receiver antenna array at Rx+1, a second family of ellipses are defined which intesect the neighboring ellipses of the neighboring receiver antenna arrays. Thus, in FIG. 5, the intruder $I_x$ has crossed the ellipse X of the receiver antenna array at $R_x$ and the ellipse X+1 of the receiver antenna array at Rx+1. The intersection of these two specific ellipses defines the location of the intruder $I_x$.

As previously mentioned, an intruder passing through N ellipses generates N Doppler cycles of 360 degrees of phase change at a phase comparator located at each of the receiver antenna arrays receiving the reflected signal portions. These are Doppler cycles. When receiving Doppler signals only, identification of each cycle received cannot be made, only its direction sense, namely positive or negative, and a number of cycle crossings can be detected. If, however, a starting location is given, then the intruder's path or track 34 (FIG. 6) can be generated. The initial position of the intruder is updated by advancing one ellipse at a time as a cycle is received and detected by the appropriate receiver antenna array, stub antenna and coupled receiver.

Two basic schemes can be utilized to generate the track 34 (FIG. 6) of the intruder crossing the surveillance zone. A first utilizes a Kalman filter to determine the velocity of the intruder and to predict the intruder's path utilizing the signals from the receivers. The advantage of utilizing a Kalman filter is that the track can be generated despite an intermittent loss of signal from the receivers. The disadvantage of utilizing a Kalman filter is that it smooths out a track so that an accurate track cannot be generated when Doppler rates change rapidly. The Kalman filter scheme generates a time lag which is added to the Doppler data in order to compute velocity.

Figure 6:
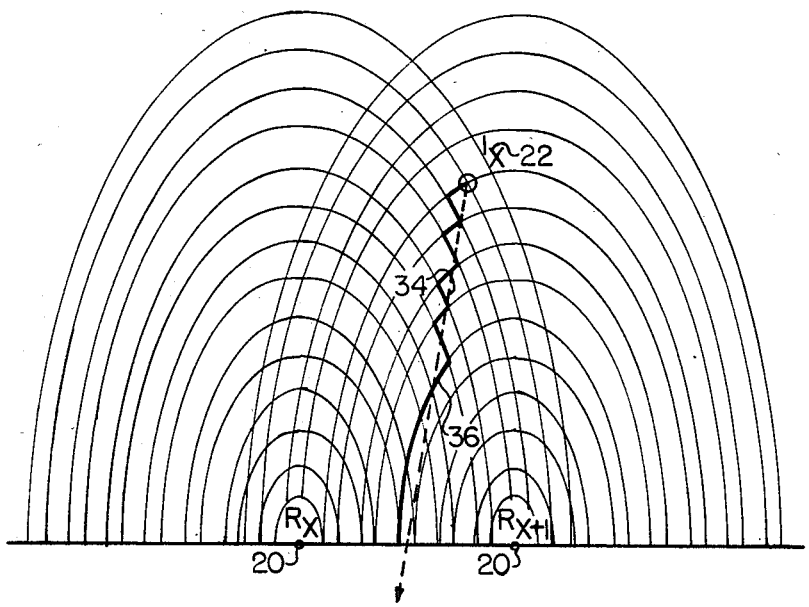
FIG. 6 illustrates a plurality of intersecting elipses surrounding a pair of the receiver antenna arrays and representing Doppler cycles of phase change which are detected by the receiver antenna arrays and processed in order to generate a track shown in phantom lines of an intruder moving across the surveillance zone generally toward the transmitter antenna.

A second scheme for generating the intruder's track utilizes an incremental step algorithm which requires no time measurements. Instead, this scheme depends upon the known location of each Doppler cycle ellipse so that when a a Doppler transition is detected, a new ellipse is located, providing a new intersection. Each Doppler cycle represents a step of approximately two and one-half to five meters at a sixty MHz radiated frequency, depending upon elliptical orientation. The algorithm can generate irregular paths but has no predictive capabilities and therefore is vulnerable to a loss in signal. The incremental step method may utilize a program stored and executed by the computer 26 (FIG. 1A) as soon as an intruder is detected. An auxiliary sensor is utilized to provide an initial detection and location of the intruder's position. This initial position, such as $I_x$, is located on two intersecting ellipses as illustrated in FIG. 6. As a positive Doppler cycle is received by one of the receiver antenna arrays at $R_x$, the position of the intruder is updated by advancing one ellipse toward that antenna, sliding along an ellipse about a second receiver antenna array $R_x+1$. Similarly, a signal received by the second receiver antenna array $R_x+1$ causes the position of the intruder to be advanced one ellipse toward the antenna array $R_x+1$, sliding along an ellipse surrounding the antenna array $R_x$. Thus, a jagged track 36 (FIG. 6) is developed. At the frequencies given above, approximately 400 cycles are generated over a one-thousand meter course. If drawn to scale, this would appear to be a smooth track 34 in FIG. 6.

It can be seen that an error in the initial location of the intruder will produce an error track which is somewhat parallel to the true track of the intruder. The initial detection of an intruder can give an approximately radio range from computed sensitivities or by calibrating field tests. Two detections from two separate receiver sites can place an intruder within a 250 meter radius circle from where the tracking could begin. However, the final accuracy is no greater than the initial range assumptions. A three receiver site can provide a measurement of the intruder's velocity and direction from Doppler information only. Three receiver sites can by sensitivity range reduce the initial location assumption but this still may not produce sufficient accuracy for some system requirements. A four receiver site response would provide the capability for uniquely pinpointing an intruder's location and generating an accurate track. However, the range for the four receiver sites would require considerably more transmitting power or many more array/stub receiving sites.

A dual Doppler system, using two CW signals utilizing the incremental step algorithm, will provide improved tracking capability without the necessity of auxiliary sensors for providing initial location data. Such a dual Doppler system can follow highly irregular paths of an intruder with a terminal tracking accuracy of within a few meters. Thus, a modification of the basic described above would involve the transmission from the central transmitter antenna 18 of two CW signals at two different frequencies, for example, sixty and fifty nine and nine-tenths 9 MHz. Two Doppler signals at each receiver site may be compared to provide a type of range measurement. Repeated average measurements during tracking of an intruder will reduce error substantially, e.g., plus or minus two meters.

In the dual frequency system, two separate frequencies radiated from the transmitter $T_x$ and received by a single receiver array 20 at $R_x$ result in Doppler signals which differ by their wave length. For example, one signal at sixty MHz (5 meters) would produce 400 cycles of Doppler over a 1,000 meter path along the major axis extension in FIG. 4 where P equals R and R equals N times lambda ($\lambda$) divided by two. If R equals 1,000 and lambda equals five, N then equals 400. A second signal of approximately 59.85 MHz with a wave length of approximately 5.01253 meters produces 399 cycles of Doppler over the same 1,000 meter path. When the phase of Doppler 1 is compared with the phase of Doppler 2, they are in phase at the receiving antenna array at $R_x$ and at 1,000 meters therefrom. At 500 meters from the receiver array, the Dopplers are 180 degrees out of phase. At 250 meters from the receiver array, the Dopplers are 90 degrees out of phase. At 750 meters from the receiver array, the Dopplers are 270 degrees out of phase. The in phase condition at zero and 1,000 meters repeats every 1,000 meters. Since there are 400 cycles of sixty MHz Doppler between zero and 1,000 meters along the major axis in FIG. 4, the second signal at 59.85 MHz, with Doppler phase comparison can be utilized to determine the ellipse number N of the sixty MHz cycle. Every 0.9 degrees of dual Doppler phase shift difference indicates that the intruder has crossed one ellipse. Thus 135 degrees of phase difference indicates that ellipse number 150 has been crossed.

An alternate method of describing the dual frequency technique utilizes the difference frequency, i.e., 60 MHz−59.85 MHz=0.150 MHz, which has a wave length of approximately 2,000 meters. Since R equals N times lamda ($\lambda$) divided by 2, then R equals 1,000, which is the range of the first Doppler cycle based upon the frequency different of 0.15 MHz. A more suitable frequency difference might be 100 KHz, having a wave length of approximately 3,000 meters, with a repeating range of 1,500 meters. This would increase ambiguous ranges.

By measuring each normal Doppler cycle for tracking purposes, range can be measured and averaged to correct for an initial location error. Repeated measurements reduce the error by the square root of the number of measurements. Ranging data may be accumulated and averaged by updating the past measurements with each VHF Doppler cycle. Tracking may be accomplished by using primarily Doppler cycles, and periodically correcting when the range data differs significantly.

Thus, three different methods may be utilized to generate a track of an intruder from Doppler cycles detected by the multiple receiver antennas. Specifically, a first can be accomplished by utilizing a Kalman filter, a second utilizes incremental steps measured from each receiver antenna array, and a third utilizes the measured Doppler difference phase. The Kalman filter technique determines the velocity of the intruder and predicts a position. By contrast, the incremental steps method and the Doppler difference method step from one isophase intersection to another without a time reference. The Kalman filter technique has the advantage of maintaining a track if the signal is momentarily lost while the incremental steps method loses data and position under such circumstances. The incremental steps method has the advantage of maintaining accurate position throughout the tracking regardless of random path motion.

Referring again to FIG. 1, the principal purpose of each of the receiver antenna arrays 20 is to pick up the portions of the radiated signal which are reflected from intruders. The gain of each receiver antenna array and the sensitivity of the VHF receiver coupled thereto determine the effective intruder tracking range for that receiving site. This tracking range then determines the number of sites required to cover the annular ring surveillance zone. (See FIG. 14).

A very significant factor that the system of the present invention accommodates is that each VHF receiver 30 (FIG. 2) not only receives a portion of the radiated signal which is reflected by an intruder but also a portion of the signal which is directly radiated from the omni directional transmitter antenna. The directly radiated signal portion is substantially stronger than the reflected signal portion, for example, 103 db greater. This difference in signal level would overload the receiver and therefore a means must be provided for eliminating direct signal overload. In addition, the noise on the direct signal could easily mask any other received signals and prevent adequate signal processing in determining Doppler sense if it were not for the special design of the receiver antenna arrays 20 hereafter described. Specifically, each receiver antenna array 20 is designed to reduce the strength of the direct signal portion it receives by forming a null in its pattern toward the transmitter while providing general coverage elsewhere.

Preferably, each of the receiver antenna arrays 20 comprises a a pair of vertically polarized dipole elements. The operation of this two-element array may be better understood by way of reference to FIG. 7 wherein each dipole elememnt 38 and 40 is shown schematically viewed from the top to show their azimuth responses. The dipole elements 38 and 40 are spaced apart by a distance d. If the dipole elements are connected by transmission lines, then the energy received by each of the elements will be added vectorially. Specifically, signal arriving at the dipole element 40 is delayed by $2\pi X/\lambda$ radians later than the signal received at the dipole element 38 for angles $\theta$ less than $\pm \pi/2$ radians ($\pm 90°$). When signals arrive at the dipole element 40, they are combined at the dipole element 38 through a transmission line (not illustrated) which extends the distance d between the dipole elements. This adds an additional delay of $2\pi d/\lambda$.

Thus, in FIG. 7, the total delay S of the signal arriving at the dipole element 40 may be expressed as follows:

$$S = 2\pi X/\lambda + 2\pi d/\lambda$$

Since $X = d \cos \theta$ then $S = 2\pi d/\lambda (\cos \theta + 1)$

Figure 7:
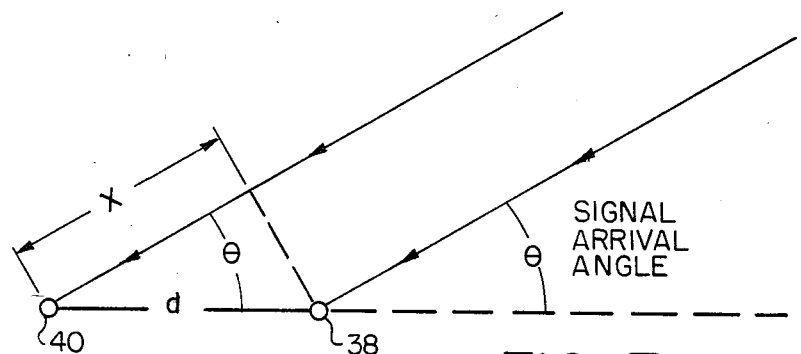
FIG. 7 illustrates the geometry of one of the two-element array receiver antennas.
Figure 8:
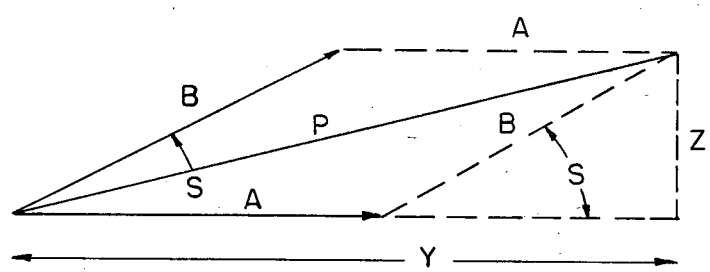
FIG. 8 illustrates the vector addition of the voltages generated by the two elements of the receiving antenna array.

FIG. 8 illustrates a vector diagram of the currents in the two-element dipole array of FIG. 7. In FIG. 8, A and B represent the two signals received by the dipole elements 38 and 40, respectively of the two element array illustrated in FIG. 7. In FIG. 8:

$Y = A + B \cos (s)$ $Z = B \sin (s)$ therefore, the resultant signal $P = \sqrt{Y^2 + Z^2}$.

Since the two dipole elements take energy from the same wave front, they must divide the energy presented to them so that $A^2 + B^2 = 1$. Then if $A = B$, then A and B are 0.707 in relative volts.

Figure 9:
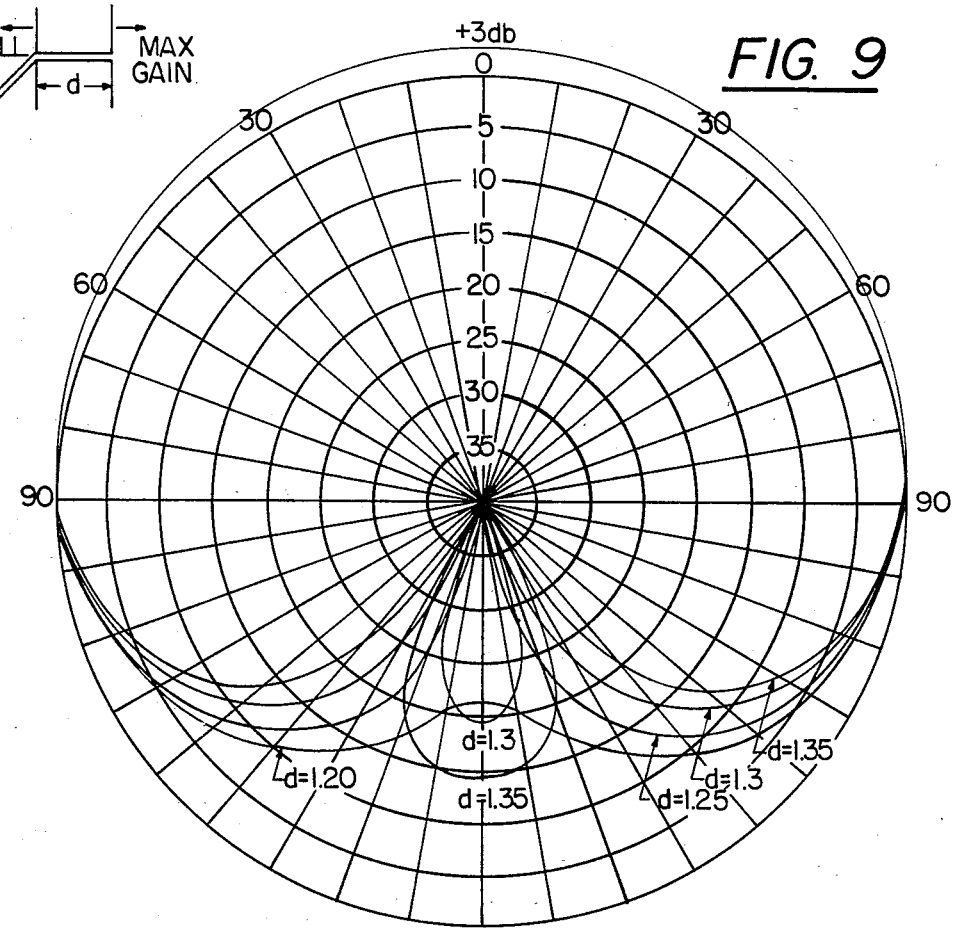
FIG. 9 is a polar graph illustrating the manner in which amplitude and phase control of the two-element receiver antenna array can be utilized to produce an antenna pattern having the desired null directed toward the transmitter antenna which overcomes overload in the reflected signal channel of the receiver coupled to the array.

Computed antenna patterns for a two-element, vertically polarized dipole array for different values of the spacing d between them are illustrated in the graph of FIG. 9. In that graph, the wave length lamda ($\lambda$) is approximately 5 meters. When $d = \lambda/4$ (1.25), a perfect cardoid pattern is formed. In FIG. 9, d is given in meters. Nearly uniform gain is obtained over 220 degrees at $d = 1.25$ meters and sharp null is located at 180 degrees. For $d = 1.35$ meters and $d = 1.3$ meters, a backlobe bubble is generated in the pattern. For $d = 1.2$ meters, only a shallow null is formed in the pattern. For unbalances in the signals A and B in FIG. 8, shallow nulls are generated for all values of d. As explained hereafter in greater detail, each of the receiver antenna arrays 20 (FIG. 1) which are circumferentially spaced around the annular surveillance zone 10 is oriented and controlled so that its pattern has a null toward the omni directional transmitter antenna 18. This enables each of the receiver antenna arrays to cover a portion of the surveillance zone while eliminating direct signal overload in the receiver 30.

Figure 10:
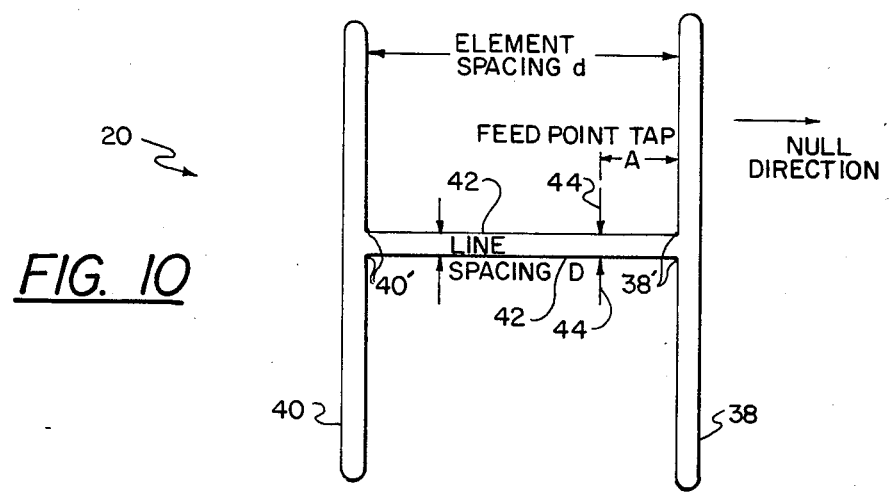
FIG. 10 is a schematic diagram of a preferred embodiment of one of the two-element receiver antenna arrays which comprises two vertically polarized dipole elements connected by a pair of spaced apart transmission lines.

FIG. 10 is a schematic illustration of one of the receiver antenna arrays 20, each of which comprises a directive endfire-type array having two substantially parallel centerfed dipole elements that are supported in spaced-apart relation by a rigid parallel-conductor transmission line. The dipole elements 38 and 40 may be of the folded type, each having a pair of terminals 38' and 40', respectively. A length of parallel-conductor transmission line comprising a pair of parallel extending transmission lines 42 connect corresponding terminals of the dipole elements. A pair of feedlines 44 are each connected to one of the transmission lines at a predetermined location along the same (left and right in FIG. 10). In order to permit the pattern of the two-element array of FIG. 10 to be adjusted to provide the required null toward the transmitter antenna, means are provided for varying the relative amplitudes at the feedlines of the signal portions received by each of the dipole elements 38 and 40. In addition, means are provided for varying the relative phases at the feedlines of the signal portions received by the separate dipole elements.

Figure 11:
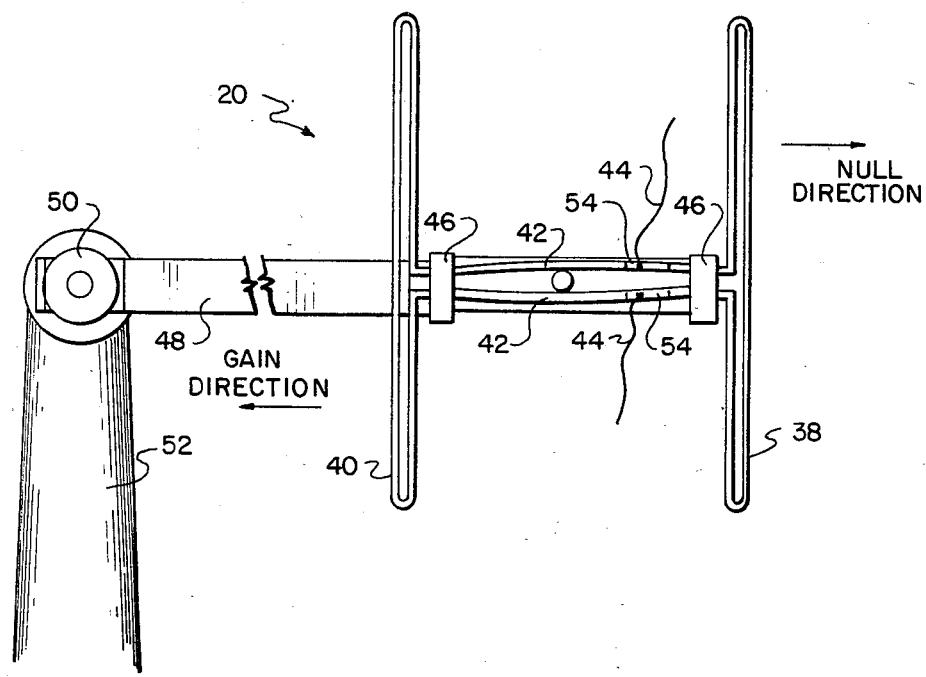
FIG. 11 is a simplified view of a two dipole receiver antenna array mounted on a supporting tower and having mechanical components for amplitude and phase adjustment to achieve the desired antenna pattern.

In a first approach, amplitude and phase adjustment is achieved by varying the spacing D between the transmission lines 42 and varying the tap locations of the feedlines along the transmission lines 44 (left and right in FIG. 10), respectively. FIG. 11 illustrates in simplified form one construction for the two element dipole array which will enable adjustment in the transmission line spacing and in the locations of the feedline taps. Each folded dipole element 38 and 40 may be made, for example, of bent aluminum tubing having a diameter of approximately three eights of an inch. The transmission lines 42 may be made of similar aluminum tubing. Pairs of blocks 46 are detachably clamped on opposite sides of the transmission lines at each end thereof. These blocks may be removed to adjust the spacing D between the transmission lines. The blocks 46 are in turn mounted to one end of a plastic support tube 48 so that the transmission lines 42 extend parallel to the tube. The other end of the tube 48 is connected through a rotating joint 50 to a support tower 52. The dipole elements 38 and 40 are vertically oriented. The feedlines 44 are connected to clips (not visible) which are slidable left and right in FIG. 11 over copper sleeves 54 surrounding corresponding ones of the transmission lines. The clips may be slid to vary the location of the feedpoint along the transmission line with a feedline attached. The antenna array of FIG. 11 may be constructed to permit adjustment of the transmission line spacing and the feed point taps through motor drive mechanisms.

Figure 12:
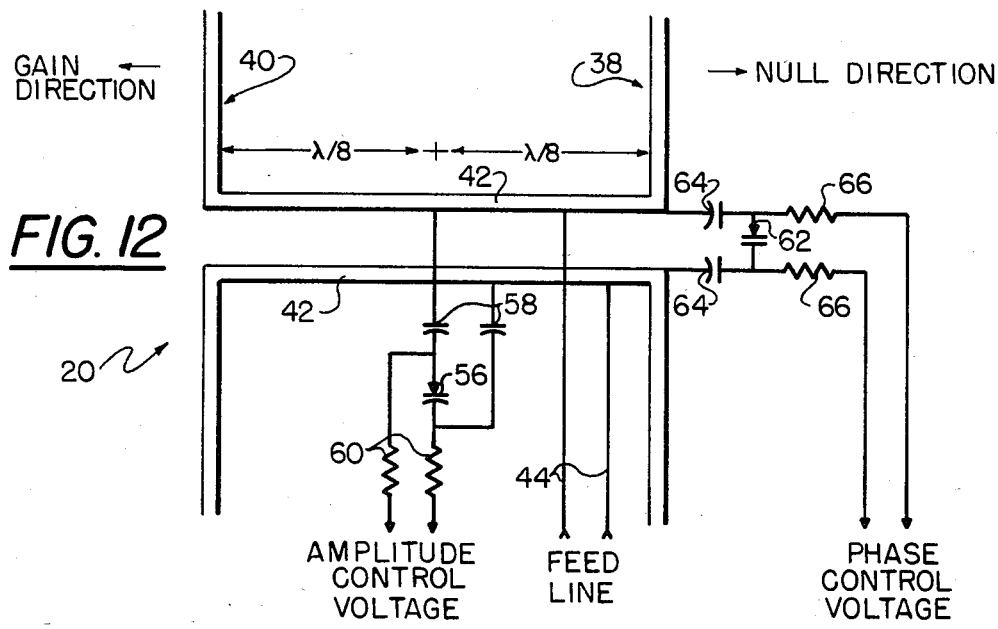
FIG. 12 is a schematic diagram of a two dipole receiver antenna array in which amplitude and phase adjustment is accomplished with variable capacitances.

Another approach for varying the relative amplitude and phase of the signal portions received by the dipole elements of the array 20 is illustrated schematically in FIG. 12. The amplitude varying means may include a variable capacitor connected to the centers of the transmission lines 42 for shunting the line with selectively-variable values of reactance. In FIG. 12, the variable capacitor is illustrated in the form of a varactor 56 connected to the centers of the transmission lines 42 through capacitors 58. The varactor 56 permits the apparent surge impedance of the transmission lines between the dipole elements 38 and 40 to be varied. The capacitance of the varactor may be varied to adjust the amplitudes of the signal portions received by the dipole elements by connecting a variable voltage source to opposite sides of the varactor through resistors 60. The centers of the transmission lines are located approximately one-eighth of a wave length from the dipole elements 38 and 40. Phase control may be similarly accomplished by connecting a variable capacitor across the terminals of the dipole 38. As illustrated in FIG. 12, this variable capacitor is provided by a second varactor 62 whose opposite ends are connected to the terminals of the dipole element 38 through capacitors 64. The varactor 62 across the terminals of one of the dipole elements permits phase angle variations as a function of the added capacitance. The capacitance of the varactor may be varied by connecting a variable voltage source to its opposite ends through resistors 66. Thus, by adjusting the amplitude and phase control voltages, the pattern of the dual dipole element antenna array 20 may be varied as needed to form a null in the pattern of the antenna array toward the transmitter antenna. Thus, the relative mounting height of the transmitter and receiver antennas, terrain configurations, and other factors can be accommodated while still permitting overload to be eliminated in the reflected signal channel of the receiver 30.

In the intruder detection system illustrated in FIG. 1, each of the receiver antenna arrays 20 must maintain a null toward the transmitter antenna at all times in order to minimize the direct signal in the intruder receiver channel. Since each of the arrays 20 receives energy over approximately 220 degrees, all non moving objects, including the ground, reflect back signals from directions not included in the null. The total signal contribution by all non moving objects in the field, which is referred to as static clutter herein, produces a fixed phase and amplitude which may shift due to changes in weather. It is possible to compensate for the miscellaneous multipath to each of the receiver antenna arrays and thereby preventing static clutter from overloading the reflected signal channel by allowing a small portion of the directly radiated signal to be received by each of the arrays. The polarity and magnitude of this small direct signal portion depends upon the adjustment of the amplitude and phase shift controls described in connection with FIG. 12. Total static clutter may change drastically due to weather conditions such as rain. In order to maintain a constant substantial attenuation of the directly radiated signal received by each of the arrays 20, a means must be provided for automatically controlling the null of each of the arrays.

Figure 13:
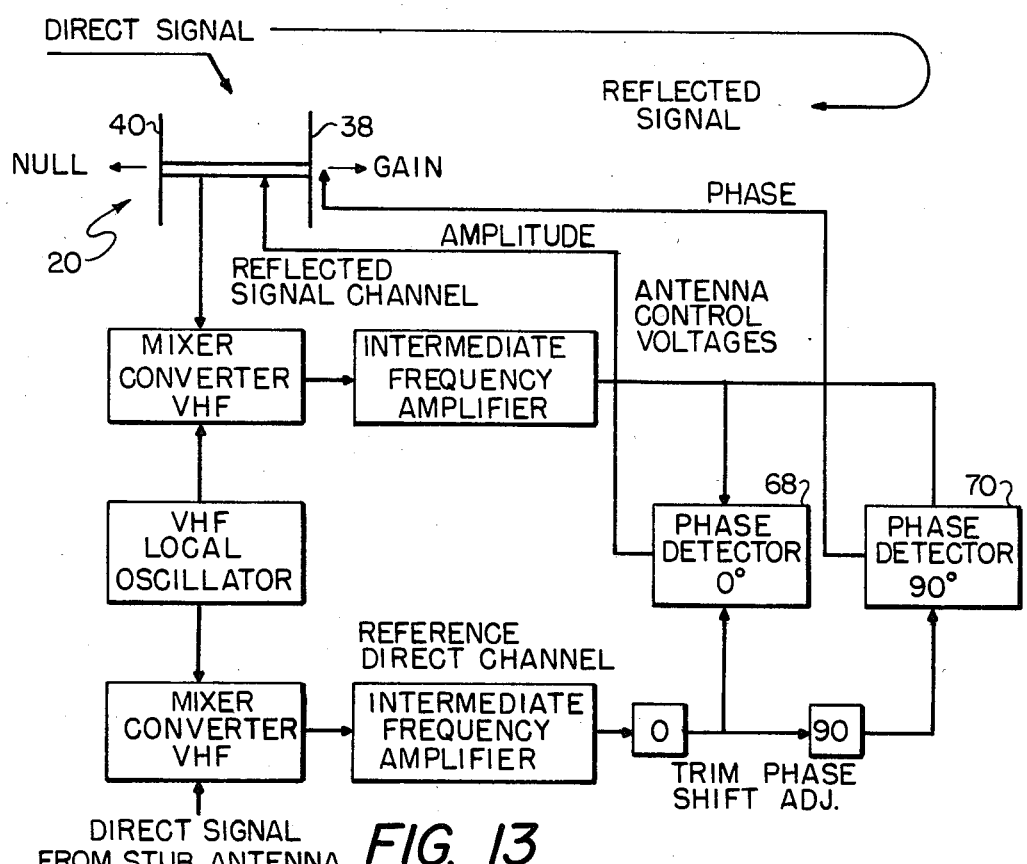
FIG. 13 is a functional block diagram of an automatic null control circuit for a two-element receiver antenna array which may be utilized in conjunction with the intruder detection system of FIGS. 1A and 1B, in order to provide the desired null back toward the transmitter antenna in each of the receiver antenna arrays and to automatically adjust for static clutter due to environmental factors.

FIG. 13 illustrates a functional block diagram of an automatic null control circuit which may be utilized with the intruder detection system of FIG. 1 to eliminate the undesirable effects of static clutter. It adjusts the two element receiver antenna array to provide gain forward and a null back toward the transmitter antenna. Each of the arrays 20 is coupled to the reflected signal channel of its VHF receiver 30. The adjacent stub antenna 21 is connected to the direct signal channel of the receiver. The reflected signal channel has in-phase and quadrature phase detectors 68 and 70 referenced to the direct signal channel. The DC output from each detector phase represents the leak-through phase of the direct signal in the intrusion channel. These voltages are amplified, scaled, and filtered and are utilized to control the capacitance of the varactors 56 and 62. The feedback sense is such that the detected output voltages are driven to a minimum so that the detected signal adjusts the null of the array 20 to a minimum. If it should rain, causing the static clutter to change, this will be detected and corrected over a period of several minutes.

Each receiver may be a dual channel superheterodyne receiver. One channel receives the directly radiated signal portion. The other channel receives the weak reflected signal portion with direct signal leak through due to imperfect null adjustment of the antenna array 20. The direct channel provides a coherent signal reference so that in the final IF stage a product detector, such as a phase detector with zero IF conversion, produces a DC output proportional to the in phase component of the received signal. The direct signal channel has two outputs in quadrature (90 degrees) and feeds two phase detectors, each giving an output representing in phase and quadrature output. The two phase outputs also represent the degree of amplitude and phase misadjustment (error) in the null of the antenna array 20. Correction is made to the antenna array by observing the proper phasing and sense to reduce the leak through direct signal.

For controlling a null significantly off axis of dipole elements 38 and 40 (FIG. 10), an increase in the spacing d between the elements may be required. For example, at a radiated signal frequency of 60 MHz, with d= to 1.35 meters, a pair of nulls are generated at 148.415 degrees and 211.585. Control of the nulls at these angles is similar to that of a single null at 180 degrees. The amplitude control veractor 56 (FIG. 12) would not be located exactly at λ/d along the transmission lines, but slightly off this location to vary the surge impedance of the transmission lines slightly and to produce a small phase shift. The small additional phase shift would be corrected out by adjusting the other veractor 62 connected across the terminals of the dipole element 38.

Figure 14:
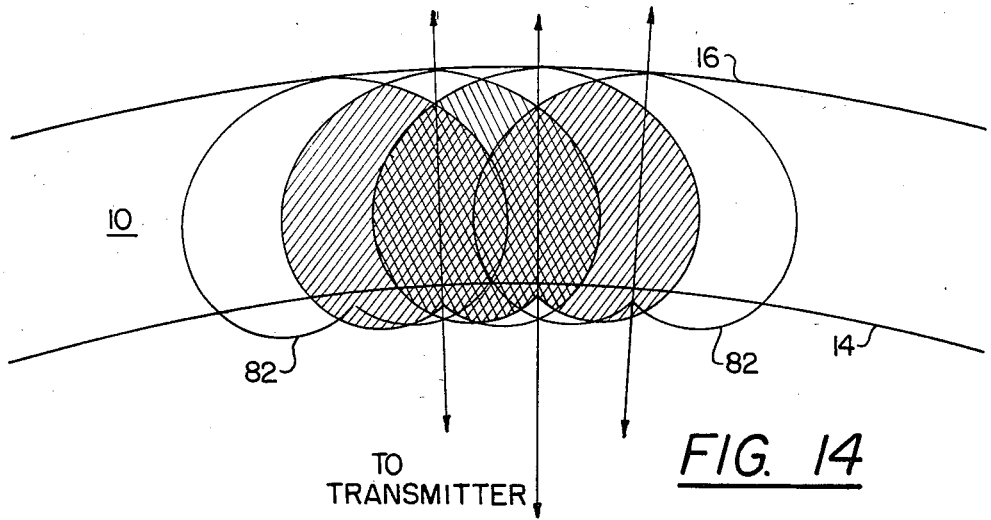
FIG. 14 is a diagramatic illustration of part of the annular ring surveillance zone shown in FIG. 1 illustrating the manner in which the patterns of the circumferentially spaced receiver antenna arrays cover the surveillance zone.

FIG. 14 illustrates a portion of the annular surveillance zone 10 and the manner in which it is covered by a plurality of overlapping plots 82 of the effective range of adjacent, circumferentially spaced two-element receiver antenna arrays 20 (not shown). The pattern of each one of these arrays has its null directed toward the transmitter antenna 18. It should be noted that in the arrangement illustrated in FIG. 14, each two-element receiver antenna array is located on the inner perimeter 14 of the surveillance zone since the back lobe or null of each array reduces the range toward the transmitter antenna.

Doppler information at any one receiver antenna array is the sum of all intrusions within that antenna's range. In order to isolate one intrusion from another, each intrusion must be handled by another pair of receiver antenna arrays. Therefore, a large number of array/stub/receiver sites with limited range can better isolate multiple intruders.

Modifications and adaptations of my intruder detection system and automatic nulling antenna array will be apparent to those skilled in the art. Therefore, the protection afforded my invention should be limited only in accordance with the scope of the following claims:

I claim:

1. An intruder detection system for a secure area perimeter, comprising:
   a omni-directional transmitter antenna positioned substantially at the center of a secure area;
   means coupled to the transmitter antenna for causing an electromagnetic continuous wave signal to radiate an annular ring surveillance zone surrounding the transmitter antenna and extending outwardly from the antenna beyond the secure area ring perimeter to an outside ring perimeter;
   a plurality of receiving antennas circumferentially spaced around the secure area ring perimeter at known distances from one another for receiving a portion of a signal reflected by an intruder moving within the annular surveillance zone, and for simultaneously receiving a portion of the direct signal radiated from the transmitter antenna;
   means coupled to the receiving antennas for comparing the reflected signal portion and the directly radiated signal portion received by the antennas and producing an output signal representative of the doppler cycles of phase difference between the reflective signal portion and the directly radiated signal portion;
   means for receiving the phase difference output signals from one or more adjacent antennas and computing tracking data representative of the location, speed and direction of motion of an intruder within the surveillance zone, and including means for displaying intruder tracking data; and
   means for transmitting the phase difference signals from the receiving antennas to the receiving and tracking means.

2. An intruder detection system according to claim 1, wherein each of the plurality of receiving antennas include:
   a reflected signal receiving antenna array; and
   a direct signal receiving antenna co-located with the reflected signal receiving antenna array.

3. An intruder detection system according to claim 1, wherein each of the reflected signal receiving antenna arrays include:
   means for producing a signal receiving pattern having a null directed toward the transmitter antenna, and
   wherein the reflected signal receiving antenna array patterns of the adjacent receiving antennas overlap one another.

4. A secure area perimeter detection system according to claim 3 wherein each reflected signal antenna array includes:
   spaced apart first and second vertically polarized dippole elements each having a pair of terminals;
   a pair of parallel extending transmission lines connecting corresponding terminals of the dippole elements;
   a pair of feed lines each connected to one of the transmission lines at a predetermined location along the same;
   means for varying the relative amplitudes at the feed lines of the signal portions received by the dippole elements; and
   means for varying the relative phases at the feed lines of the signal portions received by the dippole elements.

5. An intruder perimeter detection system according to claim 4 wherein:
   the amplitude varying means includes means for varying the spacing between the transmission lines; and
   the phase varying means includes means for varying the locations at which the feed lines are connected to the transmission lines.

6. An intruder detection system according to claim 4 wherein:
   the amplitude varying means includes a variable capacitor connected to the transmission lines; and
   the phase varying means includes a variable capacitor connected across the terminals of one of the dippole elements.

7. An intruder detection system according to claim 3 wherein the reflected signal null producing pattern means includes:
   means in cooperative operational relationship with the directly radiated signal for automatically adjusting the null pattern of the reflected signal receiving antenna arrays to minimize static clutter.

8. An intruder perimeter detection system according to claim 7 wherein the automatic null adjusting means includes a quadrature phase detector.

9. An intruder detection system according to claim 1 wherein the means coupled to the transmitter antenna includes means for causing first and second electromagnetic continuous wave signals to radiate the surveillance zone, the signals being at frequencies close to one another so that predetermined ones of the receiver antennas will receive portions of the first and second signals which are reflected by an intruder, and portions of the first and second signals which are directly radiated from the transmitter antenna; and
   the signal comparing means coupled to the receiver antennas compares the reflected and directly radiated signal portions of each of the first and second signals and produces output signals representative of doppler cycles of phase change therein; and
   the system further includes means for receiving the output signals and determining the range of the intruder.

* * * * *

UNITED STATES PATENT AND TRADEMARK OFFICE
CERTIFICATE OF CORRECTION

PATENT NO. : 4,595,924

DATED : June 17, 1986

INVENTOR(S) : JOHN B. GEHMAN

It is certified that error appears in the above-identified patent and that said Letters Patent is hereby corrected as shown below:

Column 15, line 43, claim 3, delete "1" and insert --2-- therefor.

Column 15, line 56, claim 4, delete "dippole" and insert instead --dipole--.

Column 16, line 2, claim 4, delete "dippole" and insert instead --dipole--.

Column 16, line 11, claim 4, delete "dippole" and insert instead --dipole--.

Column 16, lines 26 and 27, claim 6, delete "dippole" and insert instead --dipole--.

Signed and Sealed this

Twenty-fifth Day of November, 1986

*Attest:*

DONALD J. QUIGG

*Attesting Officer*  *Commissioner of Patents and Trademarks*